US012766730B2

(12) United States Patent
Bao et al.

(10) Patent No.: US 12,766,730 B2
(45) Date of Patent: Oct. 20, 2026

(54) MOBILE ROBOT CALIBRATION DEVICE, SYSTEM AND METHOD

(71) Applicants: TE Connectivity Solutions GmbH, Schaffhausen (CH); Tyco Electronics (Shanghai) Co., Ltd., Shanghai (CN)

(72) Inventors: Xianghao (Jorge) Bao, Shanghai (CN); Jian Cao, Shanghai (CN); Dandan (Emily) Zhang, Shanghai (CN); Senmiao Hu, Shanghai (CN); Yong (Bill) Wang, Shanghai (CN); Roberto Francisco-Yi Lu, Bellevue, WA (US); Lvhai (Samuel) Hu, Shanghai (CN)

(73) Assignees: TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 60 days.

(21) Appl. No.: 18/743,280

(22) Filed: Jun. 14, 2024

(65) Prior Publication Data

US 2024/0416523 A1 Dec. 19, 2024

(30) Foreign Application Priority Data

Jun. 16, 2023 (CN) ......................... 202310721514.5

(51) Int. Cl.
*B25J 9/16* (2006.01)
*B25J 5/00* (2006.01)
(Continued)

(52) U.S. Cl.
CPC ........... *B25J 9/1692* (2013.01); *B25J 9/1653* (2013.01); *B25J 9/1664* (2013.01); *B25J 5/007* (2013.01)

(58) Field of Classification Search
CPC ...... B25J 9/1692; B25J 9/1653; B25J 9/1664; B25J 5/007; B25J 19/0095; B25J 9/00;
(Continued)

(56) References Cited

U.S. PATENT DOCUMENTS

2016/0346930 A1* 12/2016 Hares ..................... A61B 34/30
2019/0160680 A1* 5/2019 Nagayama ............. B25J 9/1692
(Continued)

FOREIGN PATENT DOCUMENTS

CN 105783809 A * 7/2016 ............. G01B 21/00
CN 114012719 A 2/2022
(Continued)

OTHER PUBLICATIONS

Lu et al., (CN 105763809 A English translation) "Robot Calibration Test Combination Device," Jul. 20, 2016 (Year: 2016).*
(Continued)

*Primary Examiner* — Adam R Mott
*Assistant Examiner* — Byron Xavier Kasper
(74) *Attorney, Agent, or Firm* — Barley Snyder

(57) ABSTRACT

A mobile robot calibration device comprises a first positioning block and a second positioning block. The first positioning block has a positioning protrusion, and the second positioning block has a positioning slot. The positioning protrusion complements, and is adapted to mate with, the positioning slot. One of the first positioning block or the second positioning block is adapted to be installed on a flange or tool at an end of a mobile robot, and the other is adapted to be installed on a support base (e.g., a workbench).

16 Claims, 5 Drawing Sheets

(51) Int. Cl.
*B25J 19/00* (2006.01)
*G01B 21/00* (2006.01)

(58) Field of Classification Search
CPC . B25J 9/16; B25J 9/0009; B25J 9/0096; B25J 9/1612; B25J 15/0033; B25J 15/04; G01B 21/00
See application file for complete search history.

(56) References Cited

U.S. PATENT DOCUMENTS

| | | | | |
|---|---|---|---|---|
| 2020/0189115 | A1* | 6/2020 | Minami | B25J 9/1697 |
| 2020/0198146 | A1* | 6/2020 | Shen | B25J 9/1692 |
| 2023/0234220 | A1* | 7/2023 | Harmalkar | B25J 13/089 700/259 |

FOREIGN PATENT DOCUMENTS

| | | | | |
|---|---|---|---|---|
| CN | 217475950 | U | | 9/2022 |
| JP | H0911168 | A | * | 1/1997 |

OTHER PUBLICATIONS

Chinese Office Action with English translation dated May 21, 2026, corresponding to Application No. 202310721514.5, 15 pages.

* cited by examiner

MOBILE ROBOT CALIBRATION DEVICE, SYSTEM AND METHOD

CROSS-REFERENCE TO RELATED APPLICATION

This application claims the benefit of Chinese Patent Application No. CN202310721514.5 filed on Jun. 16, 2023 in the State Intellectual Property Office of China, the whole disclosure of which is incorporated herein by reference.

FIELD OF THE INVENTION

Embodiments of the present disclosure relate to a mobile robot calibration device, a mobile robot calibration system comprising the mobile robot calibration device, and a method for calibrating the mobile robot using the mobile robot calibration system.

BACKGROUND

Mobile robots are widely used in product production and manufacturing. Due to the fact that mobile robots are movable, it is necessary to recalibrate them whenever they move to a new position. In the prior art, multiple cameras are typically used to calibrate the position of the base and joints of the mobile robot. However, this visual calibration scheme has a high cost and a long calibration time, as it requires processing a large amount of image data.

SUMMARY

According to an embodiment of the present disclosure, a mobile robot calibration device comprises a first positioning block and a second positioning block. The first positioning block has a positioning protrusion, and the second positioning block has a positioning slot. The positioning protrusion complements, and is adapted to mate with, the positioning slot. One of the first positioning block or the second positioning block is adapted to be installed on a flange or tool at an end of a mobile robot, and the other is adapted to be installed on a support base (e.g., a workbench).

BRIEF DESCRIPTION OF THE DRAWINGS

The invention will now be described by way of example with reference to the accompanying Figures, of which.

DETAILED DESCRIPTION OF THE EMBODIMENTS

Figure 1:
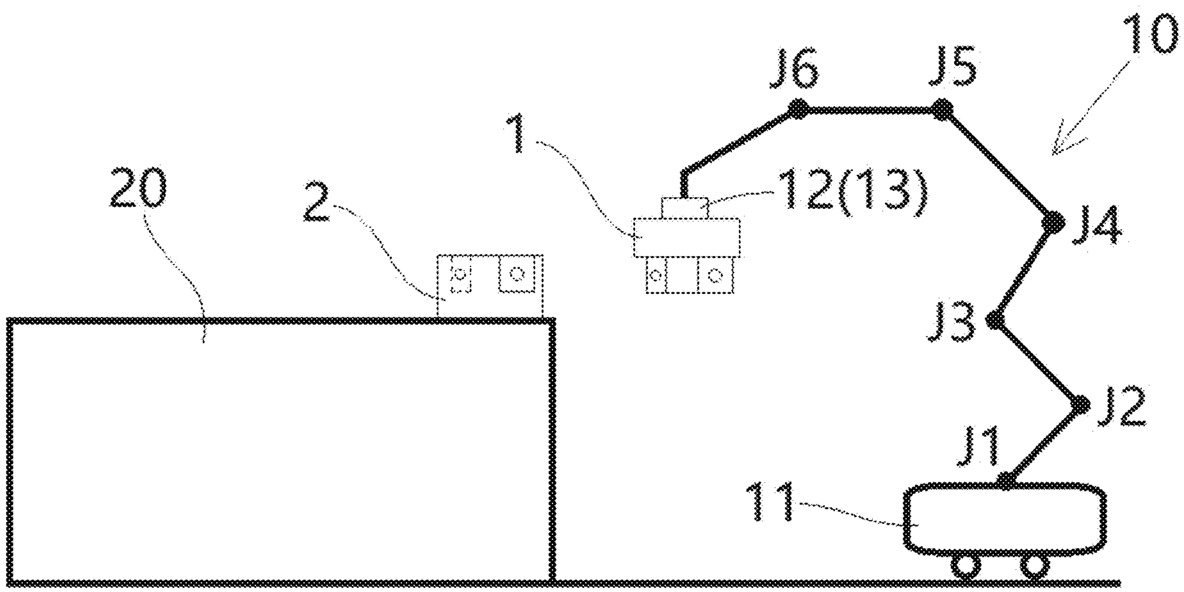
FIG. 1 shows an illustrative view of a mobile robot calibration system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one embodiment of the present disclosure, a mobile robot calibration device comprises a first positioning block having a positioning protrusion with an L-shaped cross-section, and a second positioning block having a positioning slot with an L-shaped cross-section. The positioning protrusion complements, and is suitable for matching with, the positioning slot. One of the first positioning block or the second positioning block is suitable for installation on a flange or tool at an end of a mobile robot, and the other is suitable for installation on a support base (e.g., a workbench).

According to another embodiment, a mobile robot calibration system includes a workbench which is fixed and stationary, a mobile robot that can move relative to the workbench, and the above mobile robot calibration device. One of the first positioning block or the second positioning block is installed on a flange or tool at an end of the mobile robot, and the other of the first positioning block or the second positioning block is installed on the workbench. When calibrating the mobile robot, the first positioning block and the second positioning block are matched and fixed together, so that the one positioning block installed on the mobile robot is accurately positioned at a known predetermined position.

According to another embodiment of the present disclosure, a mobile robot calibration method comprises the steps of: 1) providing the mobile robot calibration system; 2) moving the mobile robot to an initial position; 3) matching and fixing the first positioning block and the second positioning block together; and 4) calculating an initial position Pb0 of the base of the mobile robot and an initial position Pj0 of each joint of the mobile robot.

Figure 2:
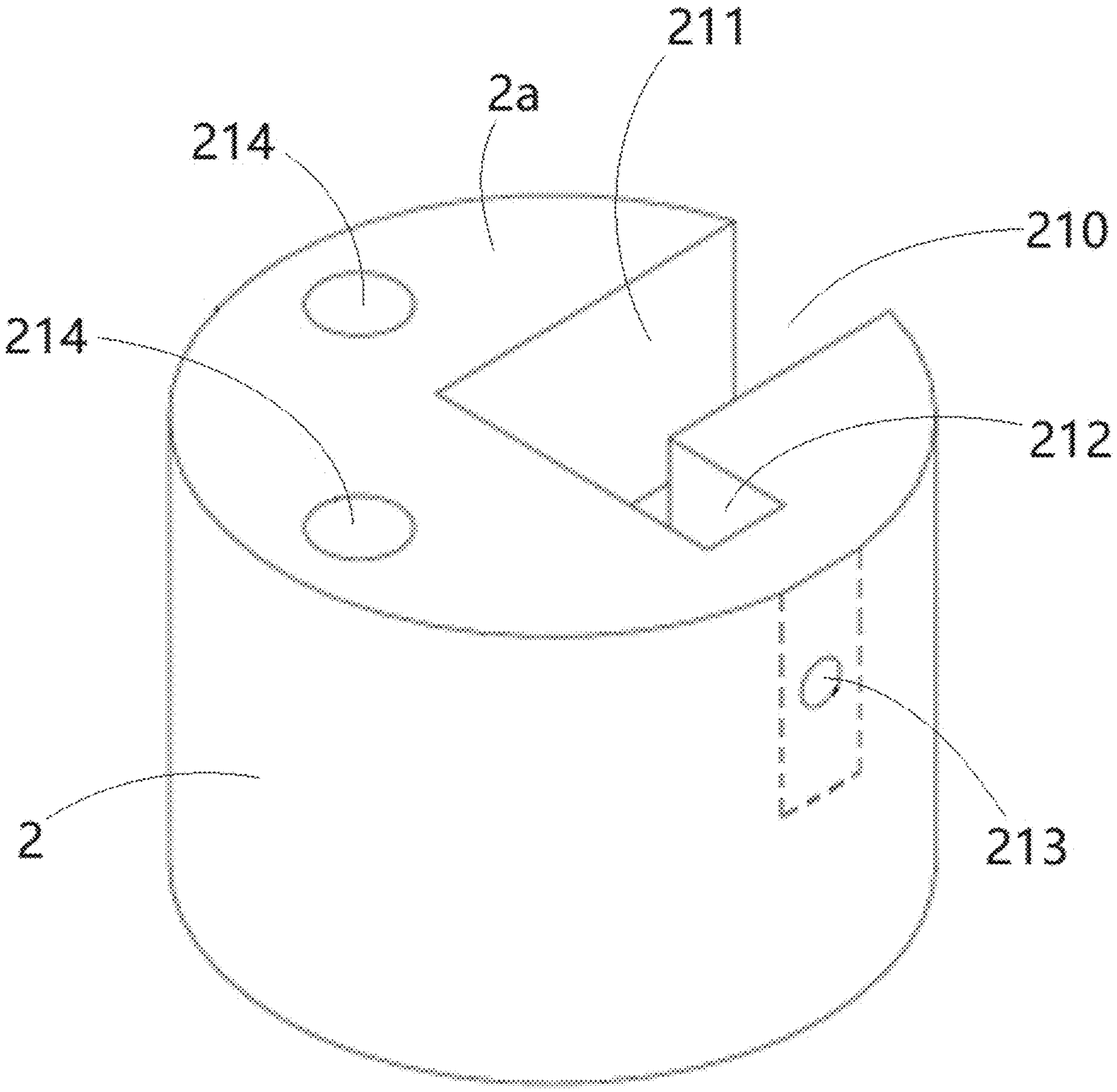
FIG. 2 shows an illustrative perspective view of the second positioning block of the mobile robot calibration device according to an exemplary embodiment of the present invention.
Figure 3:
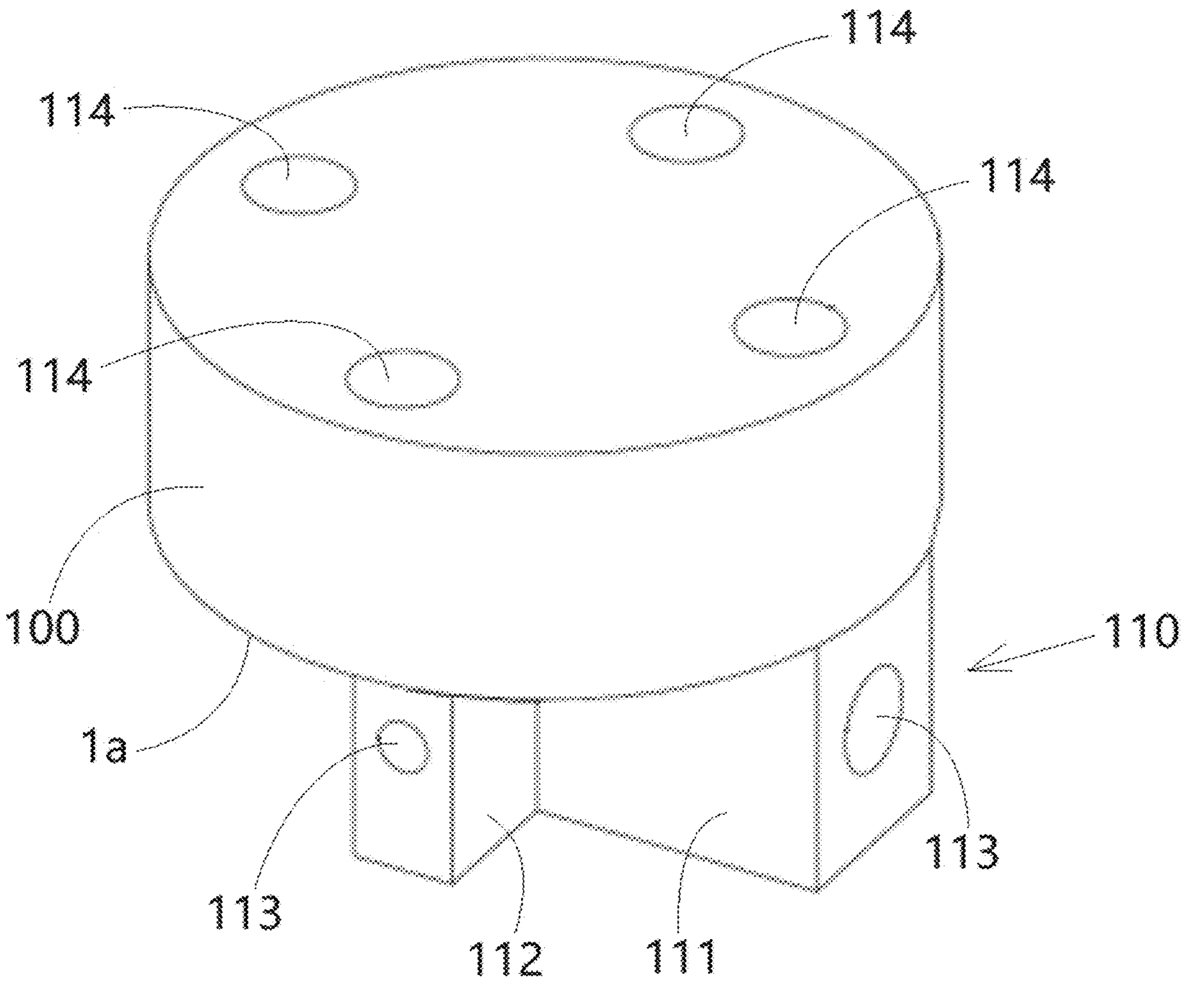
FIG. 3 shows an illustrative perspective view of the first positioning block of the mobile robot calibration device according to an exemplary embodiment of the present invention.
Figure 4:
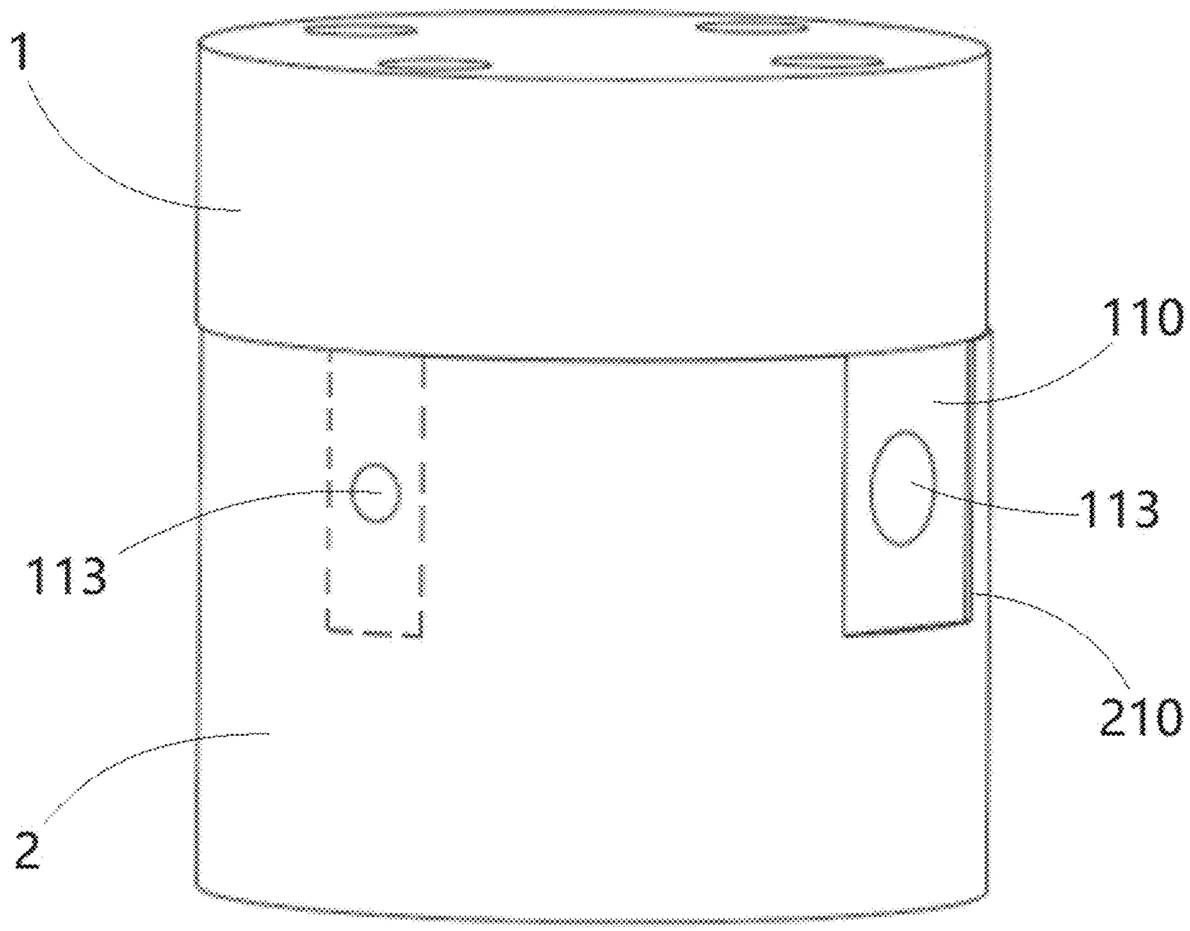
FIG. 4 shows an illustrative perspective view of a mobile robot calibration device according to an exemplary embodiment of the present invention.

FIG. 1 shows an illustrative view of a mobile robot calibration system according to an exemplary embodiment of the present disclosure. FIG. 2 shows an illustrative perspective view of the second positioning block 2 of the mobile robot calibration device according to an exemplary embodiment of the present disclosure. FIG. 3 shows an illustrative perspective view of the first positioning block 1 of the mobile robot calibration device according to an exemplary embodiment of the present disclosure. FIG. 4 shows an illustrative perspective view of a mobile robot calibration device according to an exemplary embodiment of the present disclosure.

As shown in FIGS. 1-4, in an exemplary embodiment of the present invention, a mobile robot calibration device is disclosed. The mobile robot calibration device includes a first positioning block 1 and a second positioning block 2. The first positioning block 1 has a positioning protrusion 110 with an L-shaped cross-section. The second positioning block 2 has a positioning slot 210 with an L-shaped cross-section. The positioning protrusion 110 complements with the positioning slot 210 and is adapted for matching or mating together. One of the first positioning block 1 or the second positioning block 2 is suitable for installation on a flange 12 or a tool 13 at the end of a mobile robot 10, and the other is suitable for installation on a support base or workbench 20.

The first positioning block 1 includes a base 100, and the positioning protrusion 110 is formed on the first flat surface 1*a* of the base 100 and protrudes at a predetermined height in a direction perpendicular to the first flat surface 1*a*. The positioning slot 210 is formed on the second flat surface 2*a* of the second positioning block 2 and has a predetermined depth corresponding to the predetermined height. When the first positioning block 1 and the second positioning block 2 are matched or mated together, the first flat surface 1*a* is attached to or abuts the second flat surface 2*a*.

In the illustrated embodiments, the positioning slot 210 has an installation opening located on the second flat surface 2*a* of the second positioning block 2. The positioning protrusion 110 is adapted to be inserted into the positioning slot 210 through the installation opening. A first threaded hole 113 is formed in the positioning protrusion 110 of the first positioning block 1, and a second threaded hole 213 corresponding to the first threaded hole 113 is formed in the second positioning block 2, so that the first positioning block 1 and the second positioning block 2 can be fixed together by a threaded connection member (not shown, such as a bolt or a screw) screwed into the first threaded hole 113 and the second threaded hole 213. A central axis of the first threaded hole 113 and the second threaded hole 213 is parallel to the first flat surface 1*a* and the second flat surface 2*a*. The mobile robot calibration device further includes a threaded connection member (not shown, such as a bolt or screw), which is suitable for threaded connection to the first threaded hole 113 and the second threaded hole 213 to fix the first positioning block 1 and the second positioning block 2 when mated together.

The positioning protrusion 110 comprises a first positioning protrusion 111 and a second positioning protrusion 112. The cross-section of the first positioning protrusion 111 is rectangular. The cross-section of the second positioning protrusion 112 is rectangular. The second positioning protrusion 112 is perpendicularly connected to one end of the first positioning protrusion 111. A first threaded hole 113 is formed in the first positioning protrusion 111 and the second positioning protrusion 112, respectively.

The positioning slot 210 comprises a first positioning slot 211 and a second positioning slot 212. The cross-section of the first positioning slot 211 is rectangular. The cross-section of the second positioning slot 212 is rectangular. The second positioning slot 212 is perpendicularly connected to one end of the first positioning slot 211. The first positioning protrusion 111 corresponds to the first positioning slot 211 and is suitable for assembly into the first positioning slot 211. The second positioning protrusion 112 corresponds to the second positioning slot 212 and is suitable for being assembled into the second positioning slot 212.

A first installation hole 114 is formed in the base 100 of the first positioning block 1, allowing a first connecting member (for example, a bolt or screw) to pass through, so that the first positioning block 1 can be installed on one of the mobile robot 10 and the workbench 20 through the first connecting member. A second installation hole 214 is formed in the second positioning block 2 that allows a second connection member (such as a bolt or screw) to pass through, so that the second positioning block 2 can be installed on the other of the mobile robot 10 and the workbench 20 through the second connection member. The mobile robot calibration device further comprises a first connection member and a second connection member. The first connection member passes through the first installation hole 114 in the first positioning block 1 and is connected to one of the mobile robot 10 and the workbench 20. The second connection member passes through the second installation hole 214 in the second positioning block 1 and is connected to the other of the mobile robot 10 and the workbench 20.

In another exemplary embodiment of the present invention, a mobile robot calibration system is also disclosed. The mobile robot calibration system includes a workbench 20, a mobile robot 10, and the aforementioned mobile robot calibration device. The workbench 20 is fixed and stationary. The mobile robot 10 can move relative to the workbench 20. One of the first positioning block 1 and the second positioning block 2 of the mobile robot calibration device is installed on the flange 12 or tool 13 at the end of the mobile robot 10, and the other of the first positioning block 1 and the second positioning block 2 is installed on the workbench 20.

When calibrating the mobile robot 10, the first positioning block 1 and the second positioning block 2 are matched and fixed together, so that the positioning block 1 installed on the mobile robot 10 is accurately positioned at a known predetermined position. The first positioning block 1 is installed on the flange 12 or tool 13 at the end of the mobile robot 10, and the second positioning block 2 is installed on the workbench 20.

Figure 5:
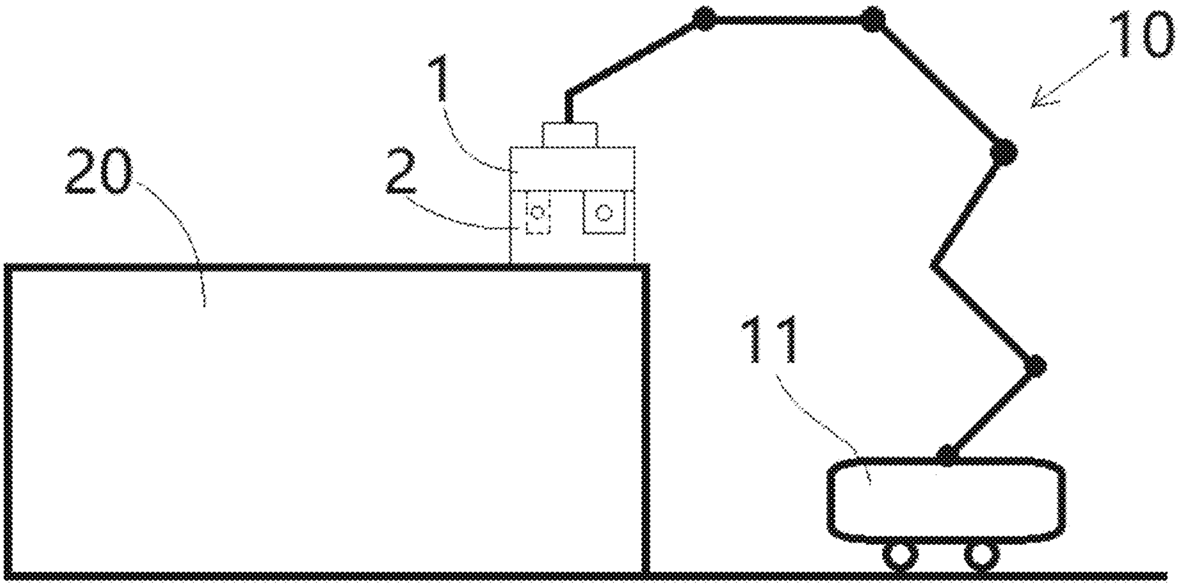
FIG. 5 shows an illustrative view of a mobile robot calibration system according to an exemplary embodiment of the present invention, wherein the mobile robot is moved to an initial position.

FIG. 5 shows an illustrative view of a mobile robot calibration system according to an exemplary embodiment of the present invention, wherein the mobile robot 10 is moved to an initial position. As shown in FIGS. 1-5, in another exemplary embodiment of the present disclosure, a mobile robot calibration method is also disclosed. The calibration method for the mobile robot includes the following steps:

S10: providing the aforementioned mobile robot calibration system;

S11: moving the mobile robot 10 to an initial position as shown in FIG. 5;

S12: matching and fixing the first positioning block 1 and the second positioning block 2 together; and

S13: calculating the initial position Pb0 of the base 11 of the mobile robot 10 and the initial positions Pj0 of each joint J1~J6 according to the following formula, $$Pb0 = Tb0 * P,$$

$$Pj0 = Tj0 * P,$$

Wherein:

Tb0 is a transfer matrix of the base 11 of the mobile robot 10 relative to the workbench 20 when the mobile robot 10 is in its initial position. This transfer matrix Tb0 can be calculated based on the angles of each joint J1~J6 of the mobile robot 10, Tj0 is a transfer matrix of the joints J1~J6 of the mobile robot 10 relative to the workbench 20 when the mobile robot 10 is in its initial position. This transfer matrix Tj0 can be calculated based on the angles of each joint J1~J6 of the mobile robot 10, and P is the position of the workbench 20, and is known and constant.

Figure 6:
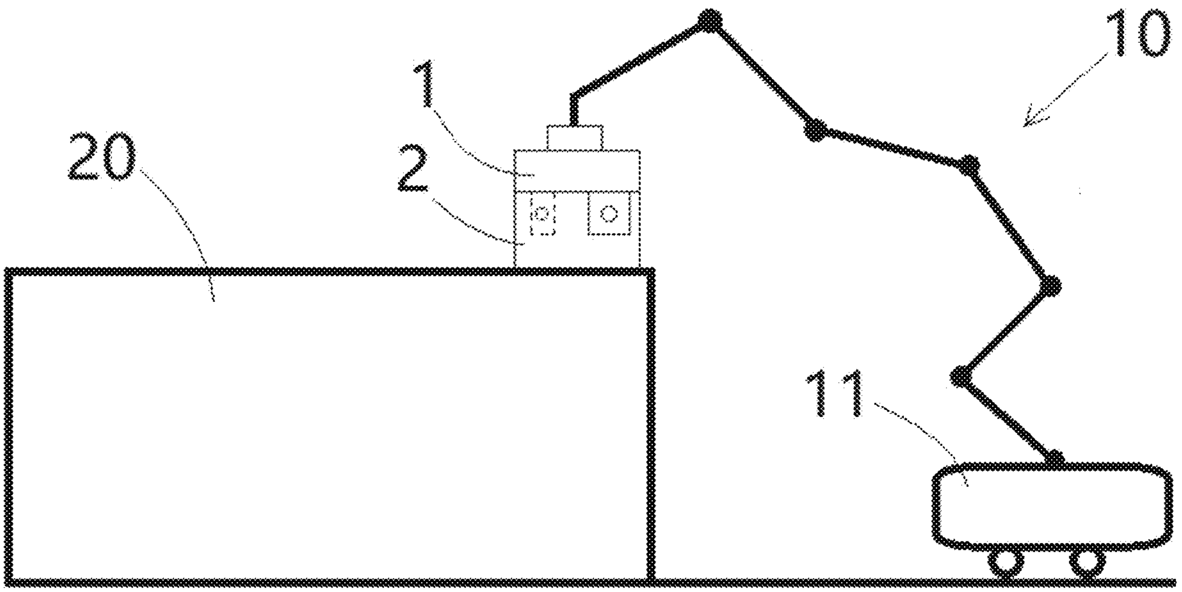
FIG. 6 shows an illustrative view of a mobile robot calibration system according to an exemplary embodiment of the present invention, wherein the mobile robot is moved to a new position.

FIG. 6 shows an illustrative view of a mobile robot calibration system according to an exemplary embodiment of the present invention, wherein the mobile robot 10 is moved to a new position different from its initial position.

As shown in FIGS. 1-6, in the illustrated embodiments, the aforementioned mobile robot calibration method further comprises the following steps:

S24: moving the mobile robot 10 to a new position as shown in FIG. 6;

S25: matching and fixing the first positioning block 1 and the second positioning block 2 together;

S26: calculating the new position Pb1 of the base 11 of the mobile robot 10 according to the following formula, $$Pb1 = Tb1 * P,$$

Wherein:

Tb1 is a transfer matrix of the base 11 of the mobile robot 10 relative to the workbench 20 when the mobile robot 10 is in the new position. This transfer matrix Tb1 can be calculated based on the angles of each joint J1~J6 of the mobile robot 10;

S27: calculating the difference ΔPb between the new position Pb1 and the initial position Pb0 of the base 11 of the mobile robot 10 according to the following formula, $$\Delta Pb = Pb1 - Pb0;$$

S28: compensating the calculated difference ΔPb to the initial positions Pj0 of each joint J1~J6 of the mobile robot, in order to obtain the new positions Pj1 of each joint J1~J6.

In this way, there is no need to calculate the new positions Pj1 of joints J1~J6 based on the transfer matrix, which can improve the calculation speed. Still referring to FIGS. 1-6, in the illustrated embodiments, should be collision occur with the mobile robot, the aforementioned calibration method can be used to recalibrate the base and initial positions of each joint of the mobile robot.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A mobile robot calibration device, comprising:

a first positioning block having a base and a positioning protrusion formed on a first flat surface of the base and protruding to a predetermined height in a direction perpendicular to the first flat surface, a first threaded hole is formed in the positioning protrusion; and a second positioning block having a positioning slot formed on a second flat surface of the second positioning block and having a predetermined depth corresponding to the predetermined height, a second threaded hole corresponding to the first threaded hole is formed in the second positioning block, the positioning protrusion complements and is adapted to mate with the positioning slot and the first flat surface abuts the second flat surface when the first positioning block and the second positioning block are mated together, the first positioning block and the second positioning block are fixed together by a connection member that is threaded and screwed into the first threaded hole and the second threaded hole, one of the first positioning block or the second positioning block is adapted to be installed on a flange or tool at an end of a mobile robot, and the other is adapted to be installed on a support base.

2. The mobile robot calibration device according to claim 1, wherein the positioning protrusion and the positioning slot each define an L-shaped cross-section.

3. The mobile robot calibration device according to claim 1, wherein the positioning slot has an installation opening located on the second flat surface of the second positioning block, and the positioning protrusion adapted to be inserted into the positioning slot through the installation opening.

4. The mobile robot calibration device according to claim 1, wherein a central axis of the first threaded hole and the second threaded hole is parallel to the first flat surface and the second flat surface.

5. The mobile robot calibration device according to claim 1, further comprising a threaded connection member adapted to be screwed into the first threaded hole and the second threaded hole to fix the first positioning block and the second positioning block together.

6. The mobile robot calibration device according to claim 1, wherein the positioning protrusion comprises:

a first positioning protrusion which has a rectangular cross-section; and a second positioning protrusion which has a rectangular cross-section and is perpendicularly connected to one end of the first positioning protrusion.

7. The mobile robot calibration device according to claim 6, wherein first threaded holes are formed in the first positioning protrusion and the second positioning protrusion, respectively.

8. The mobile robot calibration device according to claim 7, wherein the positioning slot comprises:

a first positioning slot having a rectangular cross-section; and a second positioning slot which having a rectangular cross-section and is perpendicularly connected to one end of the first positioning slot, the first positioning protrusion corresponds to the first positioning slot and is adapted to be received within the first positioning slot, and the second positioning protrusion corresponds to the second positioning slot and is adapted to be received within the second positioning slot.

9. The mobile robot calibration device according to claim 1, wherein a first installation hole is formed in the base of the first positioning block and enables a first connection member to pass through, so that the first positioning block can be installed on one of the mobile robot or the support base through the first connection member.

10. The mobile robot calibration device according to claim 9, wherein a second installation hole is formed in the second positioning block and enables a second connection member to pass through, so that the second positioning block can be installed on the other of the mobile robot or the support base through the second connection member.

11. The mobile robot calibration device according to claim 10, further comprising:

a first connection member which passes through the first installation hole of the first positioning block and connected to one of the mobile robot or the support base; and a second connection member which passes through the second installation hole of the second positioning block and connected to the other of the mobile robot or the support base.

12. A mobile robot calibration system, comprising:

a workbench which is fixed and stationary;

a mobile robot movable relative to the workbench; and a mobile robot calibration device, including:

a first positioning block having a positioning protrusion including a first positioning protrusion and a second positioning protrusion perpendicularly connected to one end of the first positioning protrusion, a first threaded hole is formed in each of the first positioning protrusion and the second positioning protrusion, respectively; and a second positioning block having a positioning slot, the positioning protrusions complement and are adapted to mate with the positioning slot, one of the first positioning block or the second positioning block is installed on a flange or tool at an end of the mobile robot, and the other is installed on a support base, wherein when calibrating the mobile robot, the first positioning block and the second positioning block are mated and fixed together by a threaded connection member extending into the first threaded hole of the first positioning protrusion and a second threaded hole of the second positioning block, so that the one positioning block installed on the mobile robot is accurately positioned at a known predetermined position.

13. The mobile robot calibration system according to claim 12, wherein the first positioning block is installed on the flange or tool at the end of the mobile robot, and the second positioning block is installed on the workbench.

14. A mobile robot calibration method, comprising the following steps of:

S10: providing the mobile robot calibration system as claimed in claim 12;

S11: moving the mobile robot to an initial position;

S12: matching and fixing the first positioning block and the second positioning block together; and S13: calculating an initial position Pb0 of the base of the mobile robot and an initial position Pj0 of each joint of the mobile robot according to the following formula, $$Pb0 = Tb0 * P,$$

$$Pj0 = Tj0 * P,$$

in which,

Tb0 is a transfer matrix of the base of the mobile robot relative to the workbench when the mobile robot is in its initial position, wherein the transfer matrix Tb0 can be calculated based on angles of the joints of the mobile robot, Tj0 is a transfer matrix of the joint of the mobile robot relative to the workbench when the mobile robot is in its initial position, wherein the transfer matrix Tj0 can be calculated based on angles of the joints of the mobile robot, and P is a known and constant position of the workbench.

15. The mobile robot calibration method according to claim 14, further comprising the steps of:

S24: moving the mobile robot to a new position;

S25: matching and fixing the first positioning block and the second positioning block together;

S26: calculating a new position Pb1 of the base of the mobile robot according to the following formula, $$Pb1 = Tb1 * P,$$

in which,

Tb1 is a transfer matrix of the base of the mobile robot relative to the workbench when the mobile robot is in the new position, wherein the transfer matrix Tb1 can be calculated based on angles of the joints of the mobile robot.

16. The mobile robot calibration method according to claim 15, further comprising the steps of:

S27: calculating the difference ΔPb between the new position Pb1 and the initial position Pb0 of the base of the mobile robot according to the following formula, $$\Delta Pb = Pb1 - Pb0;$$

and

S28: compensating the calculated difference ΔPb to the initial positions Pj0 of each joint of the mobile robot, in order to obtain the new positions Pj1 of each joint.

* * * * *